Sept. 13, 1927.　　　　W. W. WHITE　　　　1,642,056
BRAKE OPERATING MEANS
Filed Oct. 13, 1924　　　　3 Sheets-Sheet 3

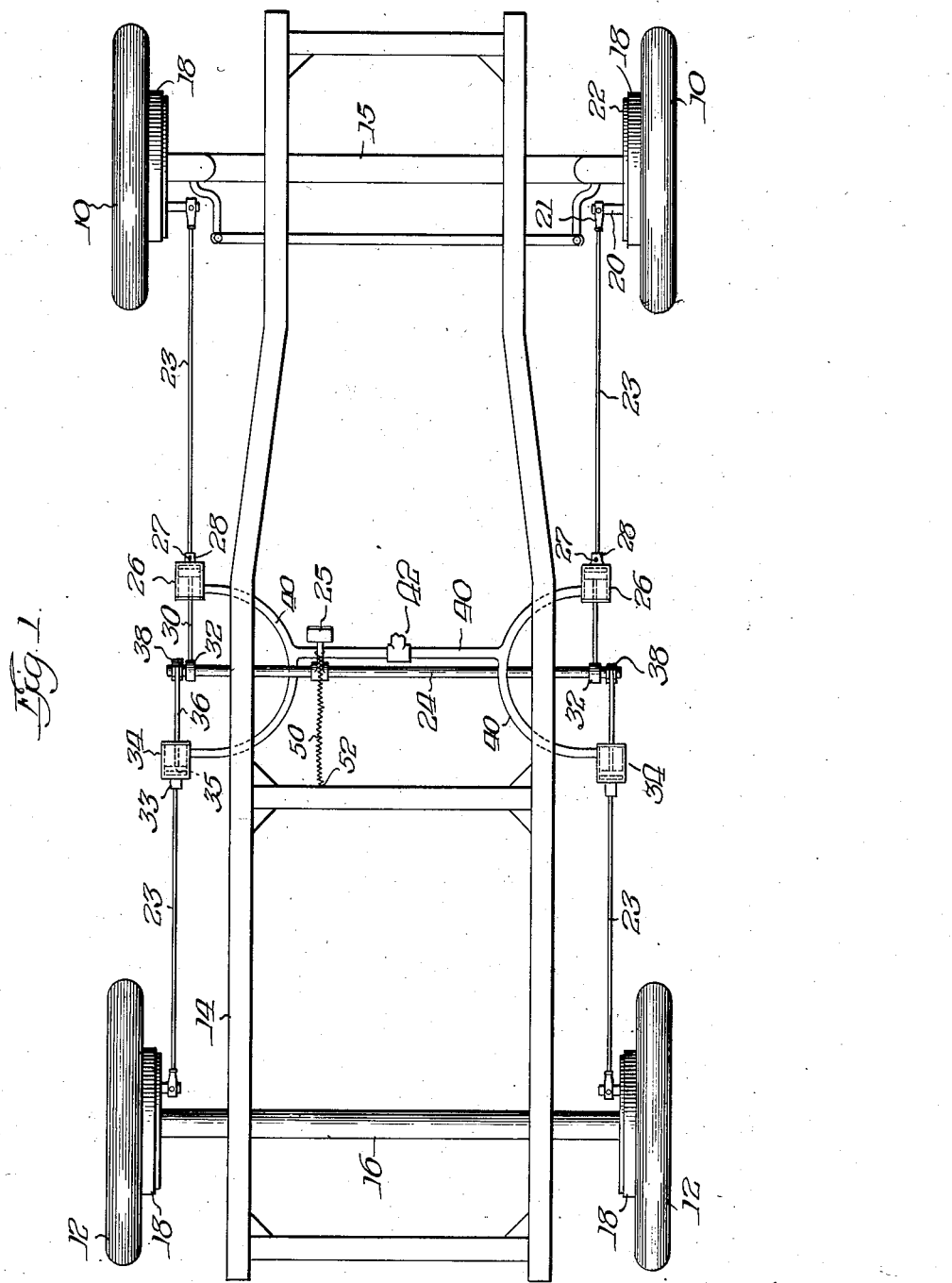

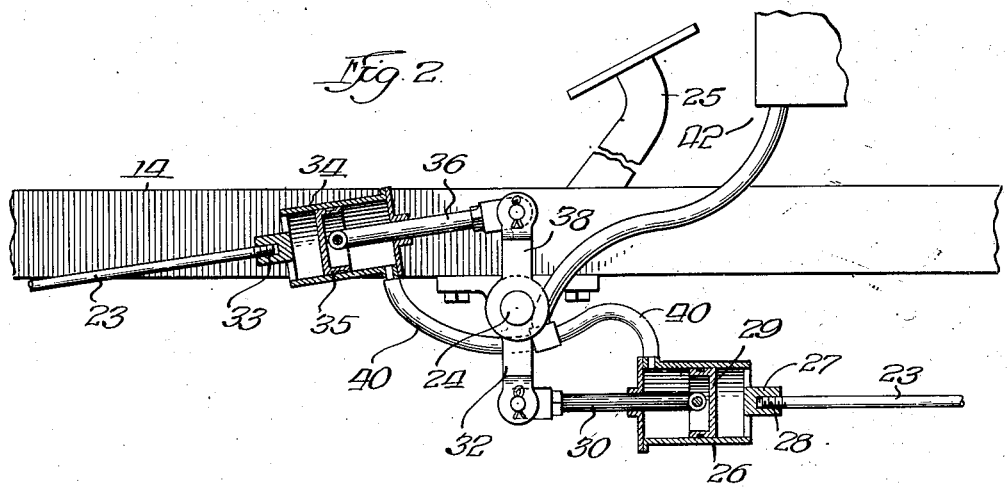
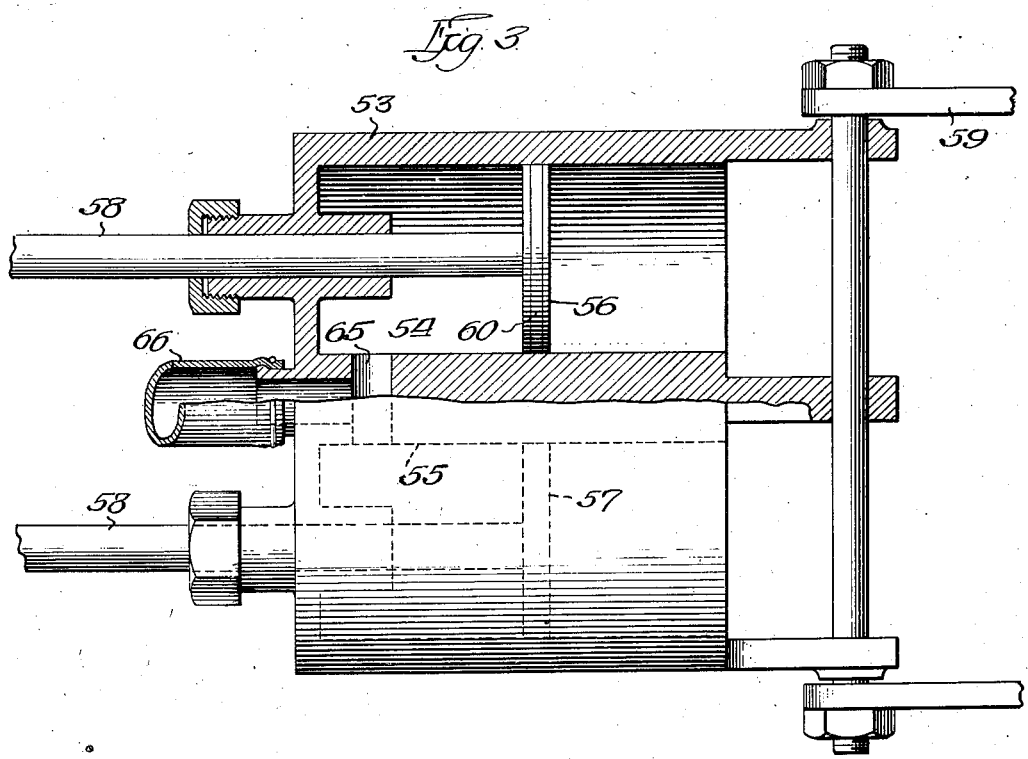

Fig. 4

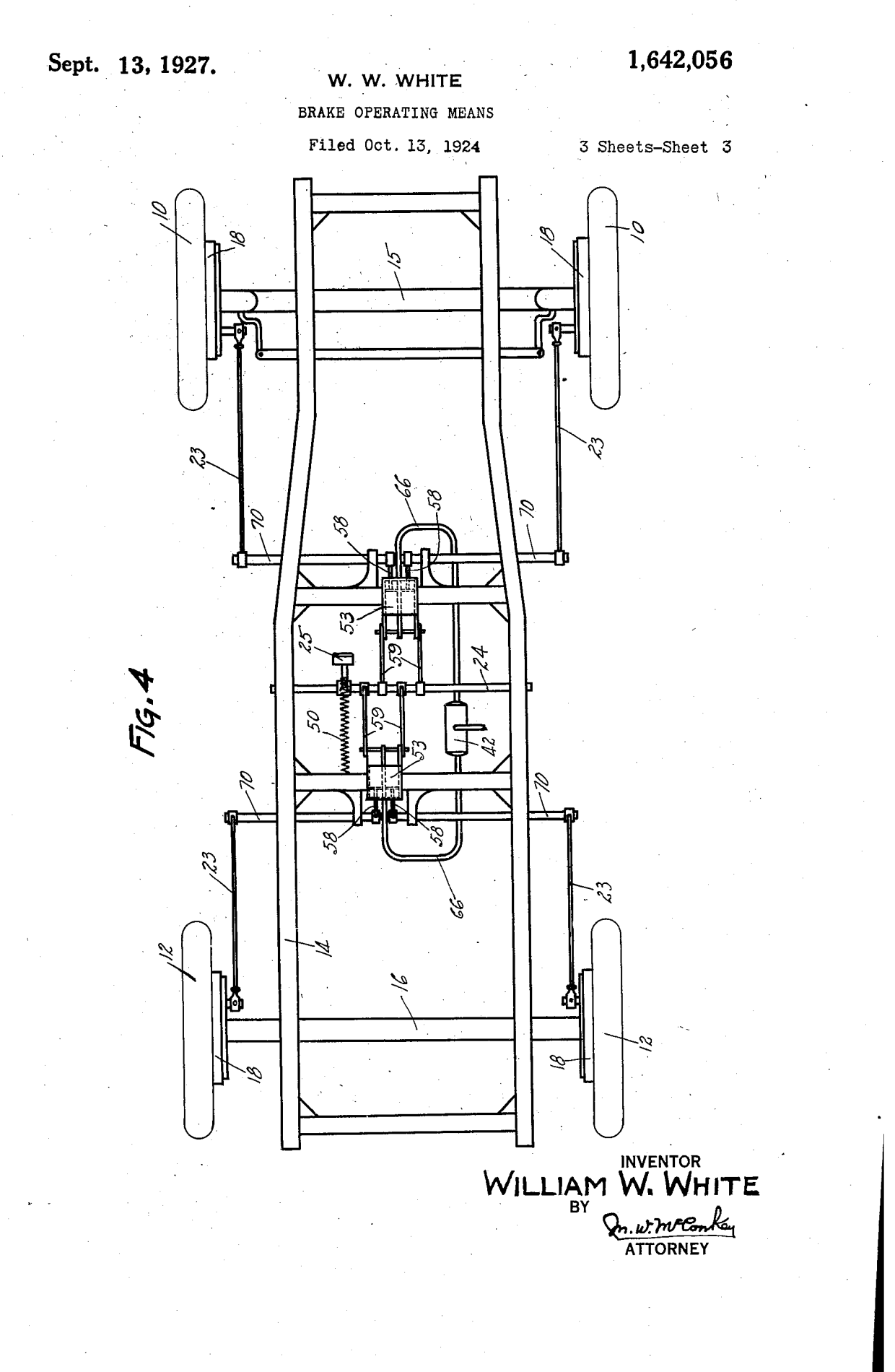

INVENTOR
WILLIAM W. WHITE
BY
*M. W. McConkey*
ATTORNEY

Patented Sept. 13, 1927.

1,642,056

UNITED STATES PATENT OFFICE.

WILLIAM W. WHITE, OF EVANSTON, ILLINOIS, ASSIGNOR TO BENDIX BRAKE COMPANY, OF CHICAGO, ILLINOIS, A CORPORATION OF ILLINOIS.

BRAKE-OPERATING MEANS.

Application filed October 13, 1924. Serial No. 743,227.

My invention relates to brake operating means and the like, and its object is the provision of a simple and generally improved mechanism for applying the braking forces equally at the respective wheels.

The invention is illustrated in the accompanying drawings, in which:

Figure 1 is a top plan view of the running gear of an automobile, illustrated in a diagrammatical way, the application of a braking system embodying my invention thereto;

Fig. 2 is a fragmentary side elevational view; partially in section;

Fig. 3 is a longitudinal section through a modified form of fluid actuating mechanism embodying my invention; and Fig. 4 is a top plan view corresponding to Fig. 1, but showing the modified mechanism of Fig. 3.

In the embodiment of the invention selected for illustration, the front wheels 10 and rear wheels 12 are mounted on the running gear 14 in any suitable or preferred manner, as rotatably upon the opposite ends of the front and rear axles 15 and 16, respectively. These features per se form no part of my present invention and a detailed description of them is deemed unnecessary.

Each of the desired wheels is provided with any suitable or preferred brake 18, the details per se of which form no part of this invention and may be varied as desired. For the purpose of illustration, I have shown at each brake a cam post 20 rocked by a lever arm 21 to expand an internal band, for example, into braking engagement with the drum 22, as is well understood in the art. The levers 21 are rocked or actuated by brake-operating rods 23 and it is with the actuation of these rods 23 by the manual operating means under the driver's control with which my present invention is particularly concerned.

The manually operable means is shown as comprising conveniently a rocking shaft 24 suitably mounted transversely across the running gear and provided, for example, with a pedal lever 25 for rocking same by means of the foot, from the driver's seat. The ends of the forwardly extending or front brake operating rods 23 are connected to the forward ends of cylinders 26, as at 27, through suitable lugs 28 which may be conveniently formed integral therewith. These ends of cylinders 26 are preferably open at 70 to prevent the trapping of air between them and the pistons. Operating in the cylinders 26 are suitable pistons or plungers 29 suitably secured on the forward ends of rods 30 which extend back through the closed rear ends of cylinders 26 and are connected to depending levers 32, fixed on the rocking shaft 24 to turn therewith. The openings in the rear ends of cylinders 26 through which rods 30 extend, may be provided with suitable glands or packing for preventing the escape or leakage of fluid from the cylinders or connecting conduits.

The forward ends of the rearwardly extending or rear brake rods 23 may be similarly connected at 33 to the open rear ends of cylinders 34 and the pistons or plungers 35 operating in cylinders 34 may be similarly connected through rods 36 to upwardly extending lever arms 38, fixed on shaft 24 to turn therewith.

The cylinders 26 and 34 are all inter-connected by flexible conduits 40 and the communicating cylinders and connecting conduits all contain and are preferably completely filled with a relatively non-compressible fluid such as oil. The fluid in the system may be supplied or replenished by means of a gravity from a suitable source of supply. It is to be understood that a pressure feed, pump feed or any other suitable or preferred means may be employed for supplying fluid to the system and replenishing same and that where necessary or desirable, a suitable check valve may be employed in the connection between the source of supply and the fluid system of my device.

From the foregoing, it will be apparent that the pistons 29 and 35 are mechanically connected to means under the control of the driver or operator and that the cylinders 26 and 34 are mechanically connected with the brake-actuating or operating means at the respective wheels. The fluid in the cylinders and interconnected conduits forms a fluid connection between the mechanical connection with the foot pedal and the mechanical connection with the brake actuating means at the wheels, and this fluid connection equalizes the application of the braking effort to the wheels without the necessity of extending the fluid connections to the wheels and making the necessary connections there.

The operation is as follows: To apply the brakes the pedal 25 is depressed to rock or turn the shaft 24 in a clockwise direction (Fig. 2). This rocking of shaft 24 is accompanied by swinging of arms 32 and 38 in the same direction, and the swinging of these arms 32 and 38 pulls the rear piston rods 36 forwardly and the front piston rods 30 rearwardly with an accompanying pulling of rods 23 to actuate or apply the brakes 18 through the fluid in the cylinders 26 and 34 and inter-connected conduits. An important feature of the invention lies in the equalizing effect of the fluid actuating connections by means of which even, equal or uniform application of all of the brakes is assured, and at the same time, extension of the fluid conduits to the respective wheels with the individual brake-actuating fluid connections at the wheels, are all avoided. The liability of leakage is minimized and the fluid connections at the wheels are avoided yet the full equalizing advantages of the fluid are secured.

The co-operating cylinders and plungers, with their connections, are simple and relatively inexpensive and they may be embodied in the mechanical actuating transmissions to the mechanically operated brakes now in common use with a minimum of alteration. As already pointed out, the conduits are preferably flexible, although jointed tubes or any other connections may be employed which will permit the relative movement that takes place. The invention is in no wise limited to four-wheel braking systems but may be employed with any brake arrangement. For restoring the pedal and associated operating parts to their normal released position, a spring 50 connected between the pedal 25 and the fixed point 52 is provided. The actuating means at the wheels may be restored to released position by spring means or any other suitable or preferred means, well known in the art, which means will restore the rear rods 23 and cylinders 34 to their normal positions. While the cylinders are described as connected to the actuating means at the wheels and the plungers or pistons to the rocking shaft, this arrangement may, of course, be reversed.

The closed ends of cylinders 26 and 34 are preferably removable, as shown, to permit access to and removal of the pistons. The connection of the open ends of the cylinders to the rods 23 may be through an integral spider, as shown, or otherwise as desired.

The movement of the pistons within the cylinders is preferably positively stopped by engagement of the pistons with the closed ends of the cylinders or suitable stops may be employed for mechanically connecting the pistons and cylinders upon a predetermined relative movement thereof. This provides a positive mechanical connection which will come into action and apply the brakes should the fluid connection leak or for any other reason fail.

Where the fluid is automatically supplied to the cylinders and connected conduits suitable means, such as a spring between the cylinder and associated piston, is preferably employed for returning the pistons and cylinders to their normal relative positions with respect to each other.

In the modification of Fig. 3 I have shown a double cylinder 53 having two chambers 54 and 55, in which the pistons or plungers 56 and 57, respectively, operate. The plungers 56 and 57 are connected through rods 58 to the brake-operating mechanism at the wheels and the double cylinder is connected through links 59 to the operating means under the control of the driver. Rods 58 are shown pivoted to arms on shafts 70, each operating one of the brake operating rods 23. The pistons 56 and 57 are provided with rings or packing 60 for preventing leakage thereabout and the openings through which rods 58 extend are made fluid tight in any suitable or preferred manner. A communicating port 65 connects chambers 54 and 55 and these chambers are supplied with oil or other suitable fluid, through a flexible connection 66.

In use in a four wheel braking system two of these double cylinders 53 are employed, one set connected to the front and the other to the rear wheels. The single flexible conduit 66 interconnects the two cylinder sets and the source of supply may be connected to this single connecting conduit between the two cylinder sets. As before spring or other suitable means (not shown) may be employed where desired for returning the pistons and cylinders to their normal relative positions and where desired a check valve may be interposed in the connection between the fluid source and the common cylinder connecting conduit 66. The ends of the cylinders toward the links 59 are open, as shown, or suitably vented to prevent the trapping of air on that side of the pistons.

I do not intend to be limited to the particular details shown and described.

I claim:

1. In combination with the running gear of a motor vehicle having wheels provided with brakes, a brake actuating rod extending to and mechanically connected with each of said brakes, an operator actuated device, fluid cylinders and co-operating pistons connected mechanically between said operator actuated device and said brake rods, and having relative movement with respect to each other, and a flexible fluid conduit connecting said cylinders.

2. In combination with the running gear of a motor vehicle having wheels provided with brakes, a brake actuating rod extending to and mechanically connected with each of said brakes, an operator actuated device, fluid cylinders and co-operating pistons connected mechanically between said operator actuated device and said brake rods, and having relative movement with respect to each other, a flexible fluid conduit connecting said cylinders and a source of fluid supply connected to said conduit.

3. In combination, a brake, an operator actuated device, a mechanical actuated connection between said device and said brake, said connection comprising members having lost motion connection and fluid means bridging said connection and operable before said mechanical connection is brought into operation.

4. In combination with the running gear of a motor vehicle having wheels provided with brakes, a rock shaft provided with a foot pedal, fluid cylinders mechanically connected with the brakes, pistons operable in said cylinders and mechanically connected with the rock shaft, and a flexible fluid conduit interconnecting said fluid cylinders.

5. In combination with the running gear of a motor vehicle having front and rear brakes, a rock shaft provided with a foot pedal, a pair of double cylinders mechanically connected to the rock shaft, a pair of pistons operable in each of said double cylinders, one pair of said pistons being connected to the rear brakes and the other pair to the front brakes, ducts connecting the cylinders of each pair and a single flexible conduit connecting the two cylinder sets.

In witness whereof, I hereunto subscribe my name this 10th day of October, 1924.

WILLIAM W. WHITE.